United States Patent [19]

Matsuzawa et al.

[11] 4,363,059

[45] Dec. 7, 1982

[54] MAGNETIC TAPE CASSETTE

[75] Inventors: Yoneo Matsuzawa; Yoshio Kawakami; Norifumi Kajimoto, all of Tokyo, Japan

[73] Assignee: TDK Electronics Co., Ltd., Tokyo, Japan

[21] Appl. No.: 193,293

[22] Filed: Oct. 2, 1980

[30] Foreign Application Priority Data

Oct. 19, 1979 [JP] Japan .................. 54-135804

[51] Int. Cl.³ ................. G11B 23/04; G11B 15/06
[52] U.S. Cl. ................. 360/132; 242/188; 360/74.6
[58] Field of Search ............ 360/132, 74.5, 74.6; 242/188, 199

[56] References Cited

U.S. PATENT DOCUMENTS

| 3,573,392 | 4/1971 | Trammell | 360/74.6 |
| 3,614,453 | 10/1971 | Johnson | 360/74.6 |
| 4,048,150 | 9/1977 | Bergmann et al. | 242/188 |
| 4,091,426 | 5/1978 | Umeda | 360/74.6 |
| 4,173,319 | 11/1979 | Umeda | 360/132 |

Primary Examiner—Alfred H. Eddleman
Attorney, Agent, or Firm—Oblon, Fisher, Spivak, McClelland & Maier

[57] ABSTRACT

A magnetic tape cassette holding a wound magnetic tape comprising a transparent base film and a magnetic layer having a thickness of 5μ or less coated on the base film comprises a hole facing a light source for detecting the tape position, a hole facing a photosenser provided so as to form a light path passing to the hole for light source through which the magnetic tape is passed and a light-shielding filter having a light transmittance in the range between 0.5 and 10 percent placed in the light path.

2 Claims, 3 Drawing Figures

MAGNETIC TAPE CASSETTE

BACKGROUND OF THE INVENTION

Field Of The Invention

The present invention relates to a magnetic tape cassette. More particularly, it relates to an improved detecting device for a reader tape in the magnetic tape cassette.

In a magnetic tape cassette, especially a VHS video tape cassette, the difference of light transmittance of a reader tape or a trailer tape from that of a magnetic tape is utilized to detect the top end and the tail end of the magnetic tape. In this case, a magnetic tape having a light transmittance of 0.05 percent or less is usually used. However, certain trouble often occurs in the magnetic tape having a light transmittance of 0.05 percent or more due to fluctuation of the thickness of the magnetic coating film on the magnetic tape or the kind of pigment included in the magnetic coating film. When a video tape operable for a long time and being thin in total thickness is designed, the thickness of the base film should be sufficiently large, so that the thickness of the coated layer is limited. As a result, the light transmittance is too high, thereby preventing the normal operation of the tape.

SUMMARY OF THE INVENTION

It is an object of the present invention to overcome the disadvantage of the conventional magnetic tape and to provide an improved structure of a magnetic tape cassette.

The foregoing and other objects of the present invention have been attained by providing a magnetic tape cassette used in a tape recorder provided with a light source and a photosenser which comprises a hole formed in a cassette casing for passing light from the light source, a hole facing the light receiving part of the photosenser which is formed in the cassette casing so as to form a light path passing through the hole for light source through which the magnetic tape is passed and a light-shielding filter having a light transmittance in the range between 0.5 and 10 percent placed in the light path.

The light source for detecting position of the magnetic tapoe and the photosenser are fixed in the tape recorder. Accordingly, the detection of light can be carried out in a stable manner when a layer coated on the magnetic type is sufficiently opaque, whereas when the transparency of the coated layer increases, the difference of the light transmittance of the reader part from that of the coated layer becomes so small that it is difficult to detect. However, the detection is easily carried out by using the filter which modifies the light transmittance.

DETAILED DESCRIPTION OF THE PREFERRED EMBODIMENT

Figure 1:
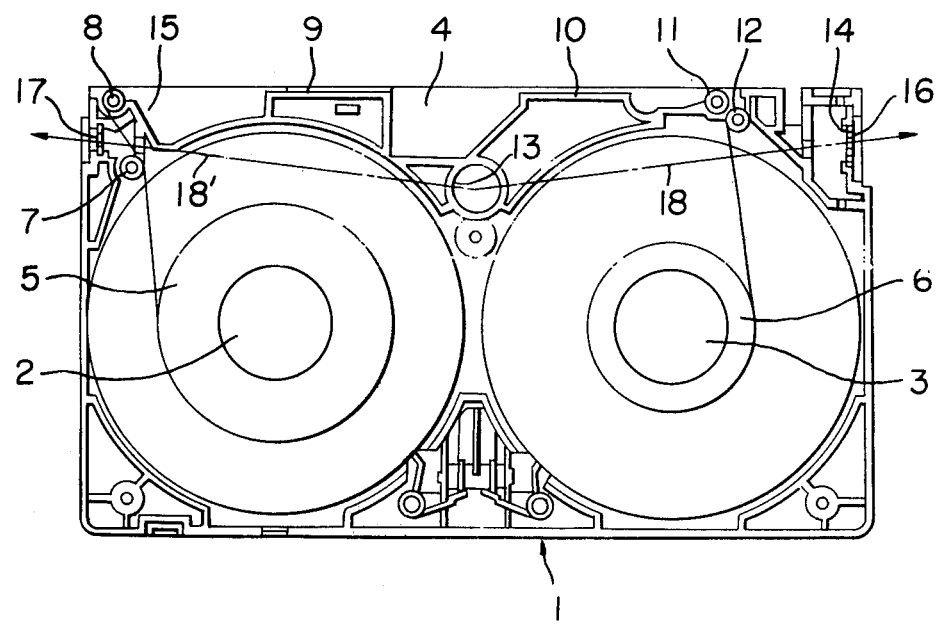
FIG. 1 is a plane view of the magnetic tape cassette of the present invention.

FIG. 1 shows a plan view of a magnetic tape cassette of the present invention in which an upper half casing is removed for convenience of the explanation. The reference numeral (1) designates a cassette casing which holds a pair of hubs (2), (3) in rotatable condition. A magnetic tape (4) is wound on the hubs to form an unwinding tape roll (5) and a winding tape roll (6) respectively. The magnetic tape unwound from the hub (2) is passed through guide rollers (7), (8) to a pair of guide surfaces (9), (10) and then, is wound on the hub (3) through guide rollers (11), (12). A hole (13) for inserting a light source (not shown) for a tape recorder is formed at the upper central portion of the cassette casing and a pair of holes (14) (15) each facing photosensers (now shown) of the tape recorder are formed at both sides of the cassette casing and the holes (14) (15) are fitted with light-shielding filters (16), (17) having a light transmittance in the range between 0.5 and 10 percents. When the tape cassette is fitted in the tape recorders, the light source is fitted into the hole (13) and the photosensers are placed adjacent to the holes (16), (17) respectively. A light beam is directed along light paths (18), (18') from the hole (13) through the tape to the holes (14), (15) and then, is passed through the filters (16), (17) to the photosensers.

The present invention will be described in detail with reference to a specific example.

Five samples were prepared by processing a surface of a polyester film having $15\mu$ thickness as the base film and forming a magnetic layer each having a thickness of $1.8\mu$, $2.5\mu$, $3.5\mu$, $5\mu$ and $7\mu$ respectively. The magnetic layer comprises 70 weight percent of cobalt-doped type $\gamma\text{-}Fe_2O_3$ powder and the remainder of a binder. The binder is prepared by mixing 5 weight percent of urethane rubber, 3.5 weight percent of nitrocellulose, 1.5 weight percent of vinyl chloride and 90 weight percent of MEK for adjustment and adding a hardener such as an isocianate compound (for example, Desmodule L manufactured by Bayer) in an amount of 15 weight percent to the total weight of resins. The light transmittance of each sample was measured by a light transmittance measuring device manufactured by NJS.

Figure 2:
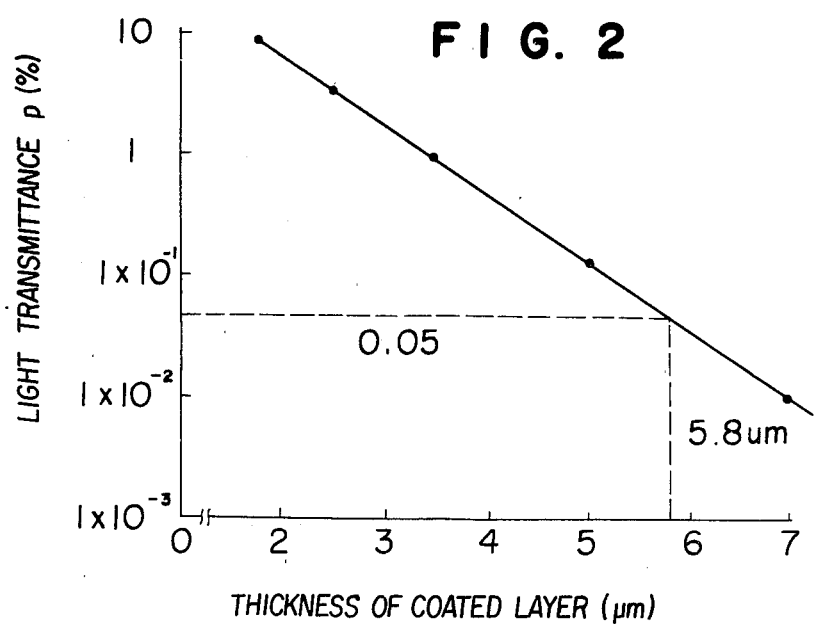
FIG. 2 is a graph showing the relation between the thickness of the coated layer of the magnetic tape and the light transmittance.

FIG. 2 shows the light transmittance $(\rho)$ of each sample. It is found from the figure that the magnetic layers must have a thickness of $5.8\mu$ or more in order to reduce the light transmittance to less than 0.05 percent. In the running operation test, it was found that the magnetic tape with a magnetic layer of $5\mu$ thick was satisfactory, however, the magnetic tape with that of $3.5\mu$ was inoperable.

Figure 3:
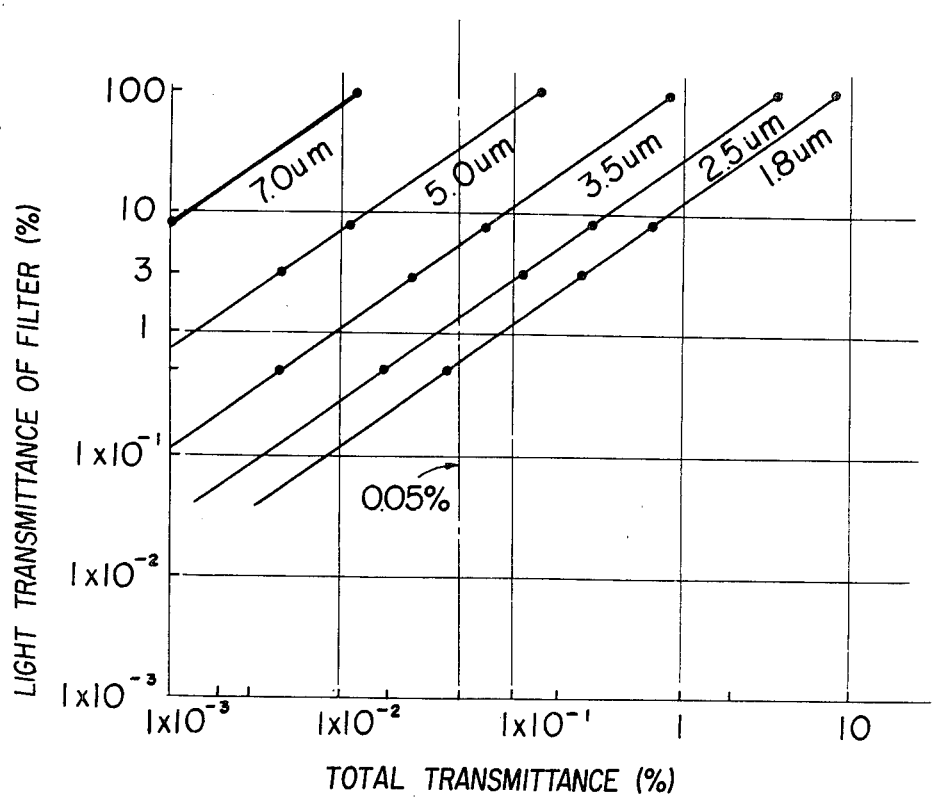
FIG. 3 is a graph showing the relation between the total light transmittance of the magnetic tape plus filters and the light transmittance of the filters.

Semitransparent films each having a light transmittance of 8 percent, 3 percent and 0.5 percent respectively were prepared and the films are fitted on the filters (16), (17) respectively and the magnetic tapes having the five kinds of thickness described above were operated. Table 1 shows results of the operations. FIG. 3 shows a graph of light transmittances of the samples plus the filters.

It is considered that the minimum thickness of the coated layer may be about $2\mu$ taking into account the low-pass output of an audio set. It is preferable to use a magnetic tape having a coated layer of the thickness in the range between 1.8 and $5\mu$ and having a light transmittance of 0.05 percent or less. In other words, it is preferable that the light transmittance of the filters be in the range about between 0.5 and 10 percent since the light transmittance of the magnetic tape with the coated layer of more than 5µ thickness is negligible. When a filter having a light transmittance of 0.5 percent or less is used, the photosenser may not be actuated even though the reader tape and the trailer tape are operated to pass before it, due to fluctuation of accuracy of a VTR.

TABLE 1

| thickness of coated layer (µm) | light transmittance of filter | | | |
|---|---|---|---|---|
| | No filter 100% | 8% | 3% | 0.5% |
| 1.8 | X | X | X | O |
| 2.5 | X | X | X | O |
| 3.5 | X | O | O | O |
| 5.0 | O | O | O | O |
| 7.0 | O | O | O | O |

O ... normally operable
X ... light transmittance no good and inoperable

As described above, in accordance with the present invention, the position of a running magnetic tape can be detected in a stable manner only by placing a light-shielding filter having a specific light transmittance in a light path into a photosenser.

We claim:

1. In a magnetic tape cassette holding a wound magnetic tape comprising a transparent base film and a magnetic layer having a thickness of 5 microns or less coated on the base film, an improvement comprising:
    a first hole means located in said cassette for inserting a light source means;
    second hole means located on the frame of said cassette for passing light emitted through said first hole means with said magnetic tape passing between said first hole means and said second hole means; and
    light-shielding filter means having light transmittance in the range between 0.5 and 10 percent fitted over said second hold means.

2. A magnetic tape cassette according to claim 1 wherein the thickness of said magnetic layer is in the range between 1.8 and 5 microns the total light transmittance of said magnetic layer and said light-shielding filter means is less than 0.05 percent.

* * * * *